US 11,549,569 B2

(12) United States Patent
Hirose

(10) Patent No.: US 11,549,569 B2
(45) Date of Patent: Jan. 10, 2023

(54) SPEED REDUCING DEVICE AND DRIVE DEVICE

(71) Applicant: NABTESCO CORPORATION, Tokyo (JP)

(72) Inventor: Shinya Hirose, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 17/481,883

(22) Filed: Sep. 22, 2021

(65) Prior Publication Data

US 2022/0099162 A1 Mar. 31, 2022

(30) Foreign Application Priority Data

Sep. 28, 2020 (JP) .............................. JP2020-162115

(51) Int. Cl.
*F16H 1/32* (2006.01)
*B25J 9/10* (2006.01)
*F16H 37/08* (2006.01)

(52) U.S. Cl.
CPC ................ *F16H 1/32* (2013.01); *B25J 9/102* (2013.01); *F16H 37/0826* (2013.01)

(58) Field of Classification Search
CPC . F16H 1/32; F16H 37/00; F16H 37/04; F16H 37/0826; F16H 37/041
See application file for complete search history.

(56) References Cited

U.S. PATENT DOCUMENTS

| 2,351,219 | A | * | 6/1944 | McMullen | ............ F16H 37/065 475/9 |
| 3,518,897 | A | * | 7/1970 | Bixby | .................... F16H 37/041 74/661 |
| 3,748,927 | A | * | 7/1973 | Hertzog | .................. F16H 37/00 475/8 |
| 9,605,736 | B1 | * | 3/2017 | Foshage | .................. F16H 25/20 |
| 11,047,366 | B2 | * | 6/2021 | Nohara | ................. F03D 7/0244 |

FOREIGN PATENT DOCUMENTS

| DE | 202014103469 U1 | * | 12/2015 | .......... B62M 11/145 |
| EP | 1209074 A1 | * | 5/2002 | ............ B63H 25/10 |
| JP | 2016-109264 A | | 6/2016 | |
| WO | WO-2008037562 A1 | * | 4/2008 | .............. B25J 9/103 |

* cited by examiner

*Primary Examiner* — Sherry L Estremsky
(74) *Attorney, Agent, or Firm* — Pillsbury Winthrop Shaw Pittman, LLP

(57) ABSTRACT

A speed reducing device according to one aspect of the present disclosure includes: a plurality of speed reducer units arranged in parallel; and an output rotating body that rotates by power received from the speed reducer units. Each of the speed reducer units includes a casing and a speed reducing mechanism unit. The casing has a peripheral wall with inner teeth disposed on an inner periphery of the peripheral wall. The speed reducing mechanism unit meshes with the inner teeth to decelerate input rotation. At least two of the speed reducer units are disposed adjacent to each other such that outer surfaces of peripheral walls of casings thereof are in contact with each other. In at least one of two peripheral walls contacting with each other, a thickness of a contact portion is smaller than a thickness of other portions in a circumference of the same peripheral wall.

17 Claims, 7 Drawing Sheets

SPEED REDUCING DEVICE AND DRIVE DEVICE

CROSS-REFERENCE TO RELATED APPLICATIONS

This application is based on and claims the benefit of priority from Japanese Patent Application Serial No. 2020-162115 (filed on Sep. 28, 2020), the contents of which are hereby incorporated by reference in their entirety.

TECHNICAL FIELD

The present disclosure relates to a speed reducing device and a drive device using the speed reducing device.

BACKGROUND

Industrial robots, machine tools and the like may include a speed reducing device to reduce the speed of rotation of a drive source such as a motor (see, for example, Japanese Patent Application Publication No. 2016-109264 ("the '264 Publication)).

In the speed reducing device disclosed in the '264 Publication, the casing has inner teeth formed on the inner periphery thereof. The casing contains a speed reducing mechanism unit that operates in mesh with the inner teeth. The speed reducing mechanism unit is connected, on its input side, with an input rotating body that rotates by power received from the drive source. The speed reducing mechanism unit is also connected, on its output side, with an output rotating body that outputs power decelerated by the speed reducing mechanism unit to the outside.

In recent years, there has been a demand for speed reducing devices with high torque capacity that is difficult to produce by existing speed reducing devices. To address this demand, it has been proposed to arrange a plurality of speed reducer units in parallel such that rotation of the output shafts of these speed reducing units is output to a same output rotating body. In this arrangement, the torques output from the speed reducer units are added together and output to the output rotating body. However, in the above structure, the respective casings of the plurality of speed reducer units are arranged in parallel, and thus the device as a whole has a large size.

SUMMARY

The present disclosure provides a speed reducing device and a drive device including a plurality of speed reducer units but having a small overall size.

(1) A speed reducing device according to one aspect of the present disclosure comprises: a plurality of speed reducer units arranged in parallel; and an output rotating body configured to rotate by power received from an output side of each of the plurality of speed reducer units. Each of the plurality of speed reducer units includes: a casing having a peripheral wall with inner teeth disposed on an inner periphery of the peripheral wall; and a speed reducing mechanism unit meshing with the inner teeth to reduce a speed of input rotation. At least two of the plurality of speed reducer units are disposed adjacent to each other such that outer surfaces of the peripheral walls of the casings thereof are in contact with each other. In at least one of any two of the peripheral walls contacting with each other, a thickness of a contact portion is smaller than a thickness of other portions in a circumference of the same peripheral wall.

(2) In each of any two of the casings of which the outer surfaces of the peripheral walls are in contact with each other, a thickness of a contact portion may be smaller than a thickness of other portions in a circumference of the same peripheral wall.

(3) In any two of the casings of which the outer surfaces of the peripheral walls are in contact with each other, a total thickness of contact portions may be equal to or smaller than a thickness of other portions of the peripheral walls of the two casings.

(4) The speed reducing mechanism unit may include an external gear meshing with the inner teeth. In any two of the plurality of speed reducer units of which the outer surfaces of the peripheral walls of the casings are in contact with each other, the corresponding external gear of each of the two speed reducer units may mesh at same timings with a meshing region of the inner teeth positioned inside the contact portion.

(5) The speed reducing mechanism unit of each of the plurality of speed reducer units may be formed of common components having same sizes and shapes.

(6) A speed reducing device according to another aspect of the present disclosure comprises: three speed reducer units arranged in parallel; and an output rotating body configured to rotate by power received from an output side of each of the three speed reducer units. Each of the three speed reducer units includes: a casing having a peripheral wall with inner teeth disposed on an inner periphery of the peripheral wall; and a speed reducing mechanism unit meshing with the inner teeth to reduce a speed of input rotation. The peripheral wall of the casing of each of the three speed reducer units is disposed in contact with the peripheral walls of the casings of the other two speed reducer units. In at least one of the peripheral walls of the casings contacting with each other, a thickness of a contact portion is smaller than a thickness of other portions in a circumference of the same peripheral wall.

(7) Three contact portions of the casings of the three speed reducer units may be formed of linear flat surfaces as viewed from an axial direction, and the flat surfaces disposed adjacent to each other may form an angle of intersection of 120° as viewed from the axial direction.

(8) An output portion of each of the plurality of speed reducer units may include a pinion gear. The output rotating body may include a ring gear meshing with the pinion gear of each of the plurality of speed reducer units.

(9) A drive device according to one aspect of the present disclosure comprises: a speed reducing device; and a drive source for transmitting a driving force to the speed reducing device. The speed reducing device includes: a plurality of speed reducer units arranged in parallel and configured to receive power from the drive source; and an output rotating body configured to rotate by power received from an output side of each of the plurality of speed reducer units. Each of the plurality of speed reducer units includes: a casing having a peripheral wall with inner teeth disposed on an inner periphery of the peripheral wall; and a speed reducing mechanism unit meshing with the inner teeth to reduce a speed of input rotation. At least two of the plurality of speed reducer units are disposed adjacent to each other such that outer surfaces of the peripheral walls of the casings thereof are in contact with each other. In at least one of any two of the peripheral walls contacting with each other, a thickness of a contact portion is smaller than a thickness of other portions in a circumference of the same peripheral wall.

The above speed reducing device is configured such that, in at least one of the peripheral walls of any two of the casings contacting with each other, a thickness of a contact portion is smaller than a thickness of other portions in a circumference of the same peripheral wall. Therefore, as compared to the case where the peripheral walls of the casings each having a uniform thickness are disposed in contact with each other, the assembly including the casings of a plurality of speed reducer units joined together can have a smaller size. Accordingly, the above speed reducing device can include a plurality of speed reducer units but have a small overall size.

DESCRIPTION OF THE PREFERRED EMBODIMENTS

The embodiments of the present disclosure will be hereinafter described with reference to the drawings. In the following embodiments and modifications, like elements will be denoted by the same reference signs and redundant descriptions will be partly omitted.

Figure 1:
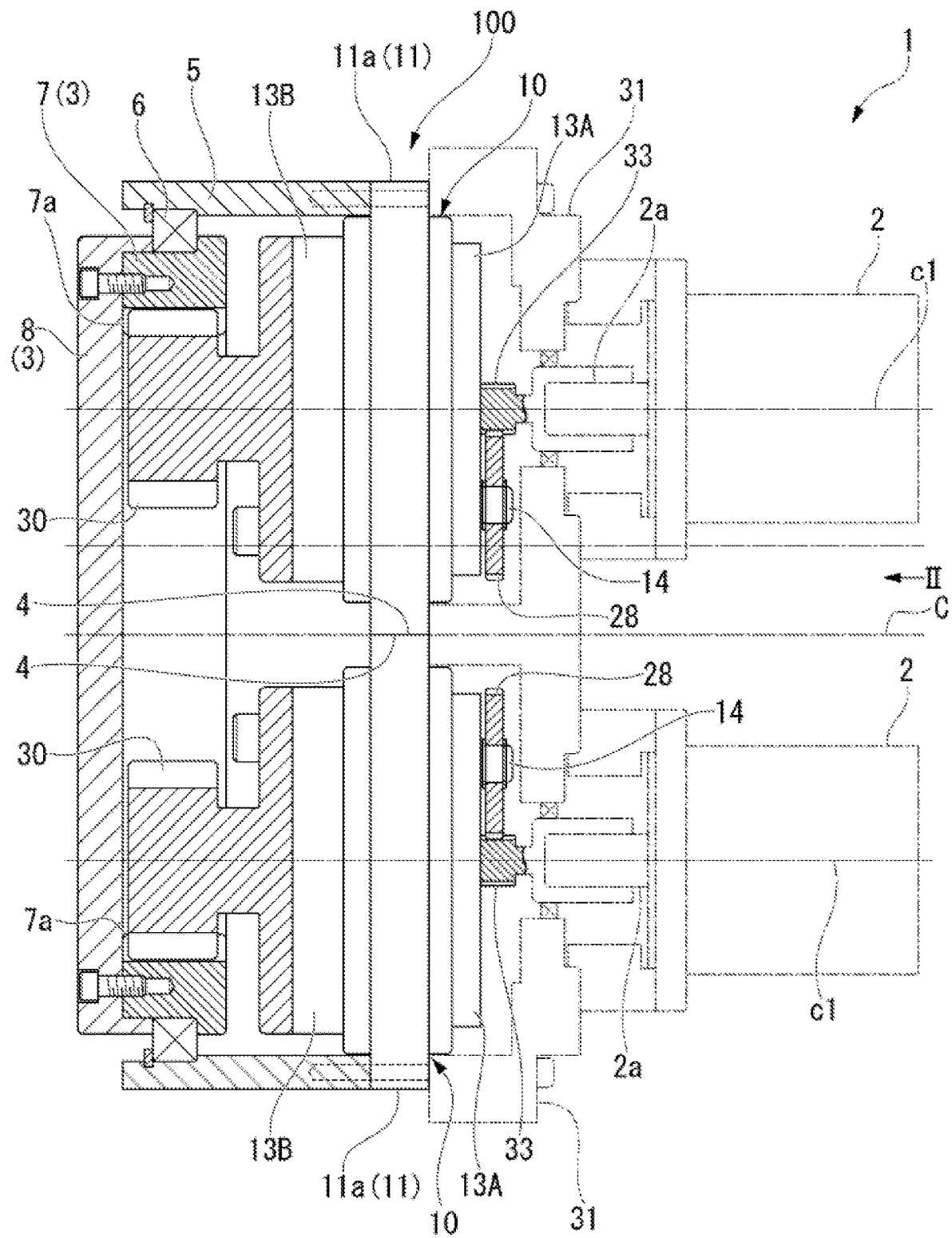
FIG. 1 is a sectional view of a speed reducing device of an embodiment, cut along the line I-I in FIG. 2.
Figure 2:
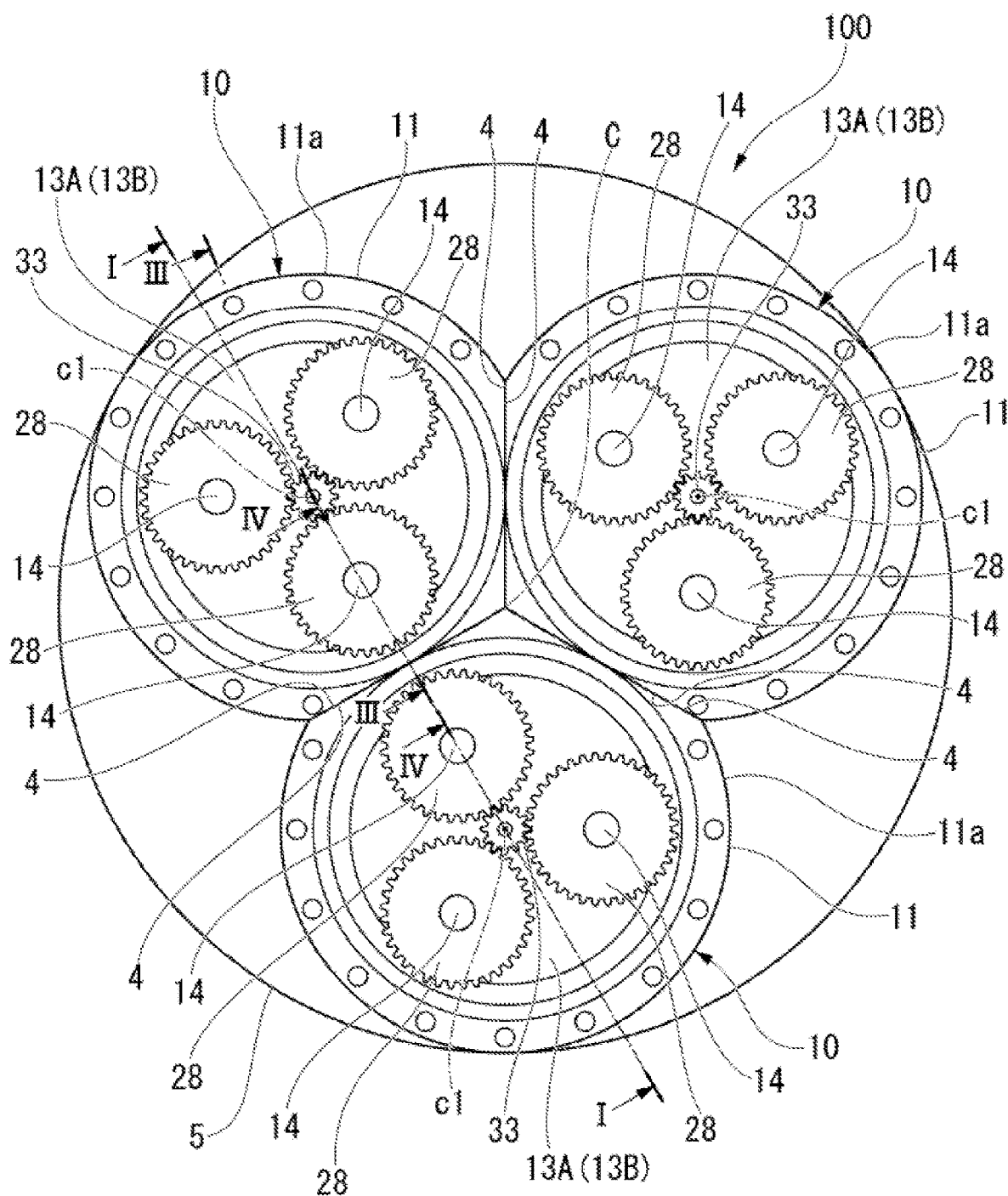
FIG. 2 is a view of the speed reducing device of the embodiment as viewed in the direction of the arrow II of FIG. 1.

The following describes the embodiment shown in FIGS. 1 to 4. FIG. 1 is a sectional view of a speed reducing device 100 of the embodiment, and FIG. 2 is a view in the direction of the arrow II of FIG. 1. The sectional view shown in FIG. 1 is cut along the line I-I in FIG. 2. The speed reducing device 100 has a plurality of motors 2 assembled to the input side thereof, and the motors 2 serve as a drive source. The speed reducing device 100 and the plurality of motors 2 constitute a drive device 1 The drive device 1 is used for a drive portion of an industrial robot, a working machine or the like.

The speed reducing device 100 of the embodiment includes three (a plurality of) speed reducer units 10 arranged in parallel and an output rotating body 3 that rotates by power received from second carrier blocks 13B (described later) of the three speed reducer units 10. The three speed reducer units 10 has the same structure. Each of the speed reducer units 10 includes a casing 11 with a peripheral wall 11a having a substantially cylindrical shape. The outer surface of the peripheral wall 11a of the casing 11 includes two flat surfaces 4 that extend in parallel with the center axis c1 of the casing 11. The two flat surfaces of the peripheral wall 11a of the casing 11 are formed to have an angle of intersection of 120° as viewed in the axial direction (as viewed along the center axis c1 of the casing 11). In the peripheral wall 11a of the casing 11, the portions including the flat surfaces 4 have a smaller thickness than the other circumferential portions in the same peripheral wall 11a.

The casing 11 of one speed reducer unit 10 is assembled to the casings 11 of the other two speed reducer units 10 such that the flat surfaces 4 are in surface contact with one another. In the embodiment, the portions including the flat surfaces 4 form contact portions at which the outer surfaces of the peripheral walls 11a of the casings 11 contact with one another. The three casings 11, of which the peripheral walls 11a contact with one another using the flat surfaces 4, are assembled to one another such that the three contact portions (the flat surfaces 4) form angles of intersection of 120° as viewed in the axial direction. In the embodiment, the three contact portions (the flat surfaces 4) contact with one another at the central position C of the three speed reducer units 10.

In the three speed reducer units 10 assembled to one another as described above, one end side of each casing 11 in the axial direction is fixed to a same output-side case 5. The output-side case 5 has a cylindrical shape and is fixed to a base member of an industrial robot, a working machine or the like. A ring gear 7 is rotatably supported on the inner peripheral surface of the output-side case 5 via a bearing 6. The ring gear 7 has a disc-shaped output plate 8 integrally fixed to the axially outside end portion of the ring gear 7. The output plate 8 is connected to a portion to be driven (driven portion) in the industrial robot, the working machine or the like. Each of the speed reducer units 10 includes a second carrier block 13B (output portion), and the second carrier block 13B has a pinion gear 30 coaxially mounted thereto. The inner peripheral surface of the ring gear 7 has inner teeth 7a meshing with the pinion gears 30. The torques output from the second carrier blocks 13B of the three speed reducer units 10 are transmitted through the meshing portions of the pinion gears 30 and the ring gear 7 to the output rotating body 3 as a combined torque. In the embodiment, the ring gear 7 and the output plate 8 constitute the output rotating body 3.

An end cover 31 is mounted to the other axial end side of the casings 11 of the three speed reducer units 10. The motors 2 for providing a driving force to the speed reducer units 10 are mounted to the end cover 31. The rotational shafts 2a of the motors 2 are mounted to input gears 33 for transmitting power to the crankshafts 14 (described later) of the associated speed reducer units 10.

Figure 3:
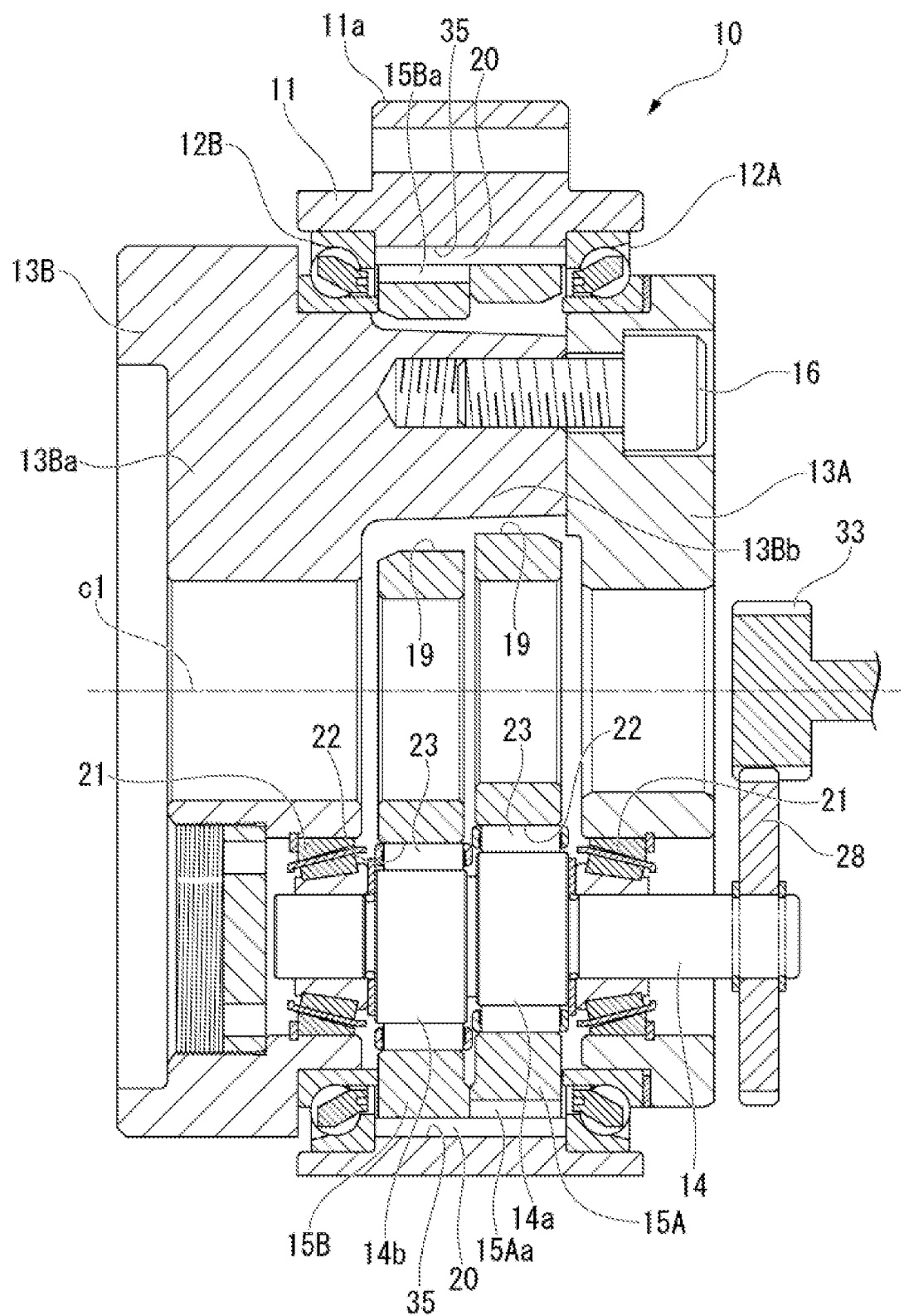
FIG. 3 is a sectional view of a speed reducer unit of the embodiment, cut along the line in FIG. 2.

FIG. 3 is a sectional view of the speed reducer unit 10 cut along the line III-III in FIG. 2. The speed reducer unit 10 includes the casing 11 having the peripheral wall 11a, a first carrier block 13A and the second carrier block 13B rotatably retained on the inner peripheral side of the peripheral wall 11a, a plurality (for example, three) of crankshafts 14 rotatably supported on the first carrier block 13A and the second carrier block 13B, and a first oscillating gear 15A and a second oscillating gear 15B that rotate oscillatorily with two eccentric portions 14a, 14b provided on each of the crankshafts 14.

The first carrier block 13A has a disc-like shape with a hole formed therein. The second carrier block 13B includes a substrate portion 13Ba and a plurality (for example, three) of support columns 13Bb. The substrate portion 13Ba has a disc-like shape with a hole formed therein, and the plurality of support columns 13Bb extend from the end surface of the substrate portion 13Ba toward the first carrier block 13A. The second carrier block 13B is joined to the first carrier block 13A, with the end surfaces of the support columns 13Bb abutting on the end surface of the first carrier block 13A. The support columns 13Bb of the second carrier block 13B are fastened to the first carrier block 13A by a bolt 16.

A gap extending in the axial direction is maintained between the first carrier block 13A and the substrate portion 13Ba of the second carrier block 13B. In this gap, the first oscillating gear 15A and the second oscillating gear 15B are arranged. The first and second oscillating gears 15A and 15B each have relief holes 19 formed therein, which are penetrated by the support columns 13Bb of the second carrier block 13B. The relief holes 19 have a sufficiently larger inner diameter than the support columns 13Bb, so that the support columns 13Bb do not prevent the revolution of the first and second oscillating gears 15A and 15B.

The peripheral wall 11a of the casing 11 extends over the outer peripheral surface of the first carrier block 13A and the outer peripheral surface of the substrate portion 13Ba of the second carrier block 13B. The axially opposite ends of the peripheral wall 11a are rotatably supported by the first carrier block 13A and the substrate portion 13Ba of the second carrier block 13B, respectively, via the bearings 12A, 12B. In the inner peripheral surface of the axially middle region of the peripheral wall 11a (the region facing the outer peripheral surfaces of the first and second oscillating gears 15A and 15B), there are formed a plurality of pin grooves 35 extending in a direction parallel to the center axis c1 of the casing 11. Each of the pin grooves 35 retains an inner tooth pin 20 therein. The inner tooth pins 20 have a substantially cylindrical shape and are retained in a rotatable manner. The plurality of inner tooth pins 20 attached to the inner peripheral surface of the peripheral wall 11a face the outer peripheral surfaces of the first and second oscillating gears 15A and 15B. In the embodiment, the inner tooth pins 20 retained in the pin grooves 35 constitute the inner teeth of the casing 11.

The first and second oscillating gears 15A and 15B have an outer diameter slightly smaller than the inner diameter of the casing 11. On the outer peripheral surface of the first oscillating gear 15A, outer teeth 15Aa are formed such that the outer teeth 15Aa contact in a meshing manner with the inner tooth pins 20 disposed on the inner peripheral side of the casing 11. On the outer peripheral surface of the second oscillating gear 15B, outer teeth 15Ba are formed such that the outer teeth 15Ba contact in a meshing manner with the inner tooth pins 20 disposed on the inner peripheral side of the casing 11. The respective numbers of the outer teeth 15Aa, 15Ba formed on the outer peripheral surfaces of the first oscillating gear 15A and the second oscillating gear 15B are slightly smaller than the number of the inner tooth pins 20 (by one, for example).

The crankshafts 14 are arranged on the same circumference centered at the center axis c1 of the first and second carrier blocks 13A and 13B. Each of the crankshafts 14 is rotatably supported by the first carrier block 13A and the second carrier block 13B via the bearings 21. The eccentric portions 14a, 14b of each crankshaft 14 penetrate the first oscillating gear 15A and the second oscillating gear 15B, respectively. The eccentric portions 14a, 14b are rotatably engaged, via eccentric portion bearings 23, with support holes 22 formed in the first oscillating gear 15A and the second oscillating gear 15B, respectively. The two eccentric portions 14a, 14b of each crankshaft 14 are positioned eccentrically such that they are out of phase with each other by 180° around the axis of the crankshaft 14.

When the plurality of crankshafts 14 receive an external force (the driving force of the motor 2) and rotate in one direction, the eccentric portions 14a, 14b of each crankshaft 14 revolve in the same direction at predetermined radii, such that the first oscillating gear 15A and the second oscillating gear 15B revolve in the same direction at the same radii. Simultaneously, the outer teeth 15Aa of the first oscillating gear 15A and the outer teeth 15Ba of the second oscillating gear 15B contact in a meshing manner with the inner tooth pins 20 retained on the inner peripheral surface of the casing 11. One end portion of each crankshaft 14 penetrates the first carrier block 13A and projects axially outward beyond the first carrier block 13A. The end portion of each crankshaft 14 projecting from the first carrier block 13A has a crankshaft gear 28 mounted thereto. Each crankshaft gear 28 meshes with the input gear 33 of the motor 2. The input gear 33 rotates by the driving force received from the motor 2.

In the speed reducing device 10 of the embodiment, the respective numbers of the outer teeth 15Aa and 15Ba of the first and second oscillating gears 15A and 15B are slightly smaller than the number of the inner tooth pins 20 on the casing 11 side. Therefore, during one revolution of the first oscillating gear 15A and the second oscillating gear 15B, the first oscillating gear 15A and the second oscillating gear 15B receive a reaction force in a rotational direction imparted from the inner tooth pins 20 on the casing 11 side. This causes the first oscillating gear 15A and the second oscillating gear 15B to spin by a predetermined pitch in a direction counter to the direction of the revolution. As a result, the first carrier block 13A and the second carrier block 13B, which are engaged with the first oscillating gear 15A and the second oscillating gear 15B via the crankshafts 14, rotate in the same direction and at the same pitch as the first oscillating gear 15A and the second oscillating gear 15B. As a result, the rotation of the crankshafts 14 is output as the decelerated rotation of the first carrier block 13A and the second carrier block 13B. In the embodiment, since the eccentric portions 14a, 14b of each crankshaft 14 are positioned eccentrically so as to be out of phase with each other by 180° around the axis, the first oscillating gear 15A and the second oscillating gear 15B revolve out of phase with each other by 180°. Further, in the embodiment, the first oscillating gear 15A, the second oscillating gear 15B, the crankshafts 14, the first carrier block 13A, the second carrier block 13B, and other members constitute an eccentrically oscillating speed reducing mechanism unit.

Figure 4:
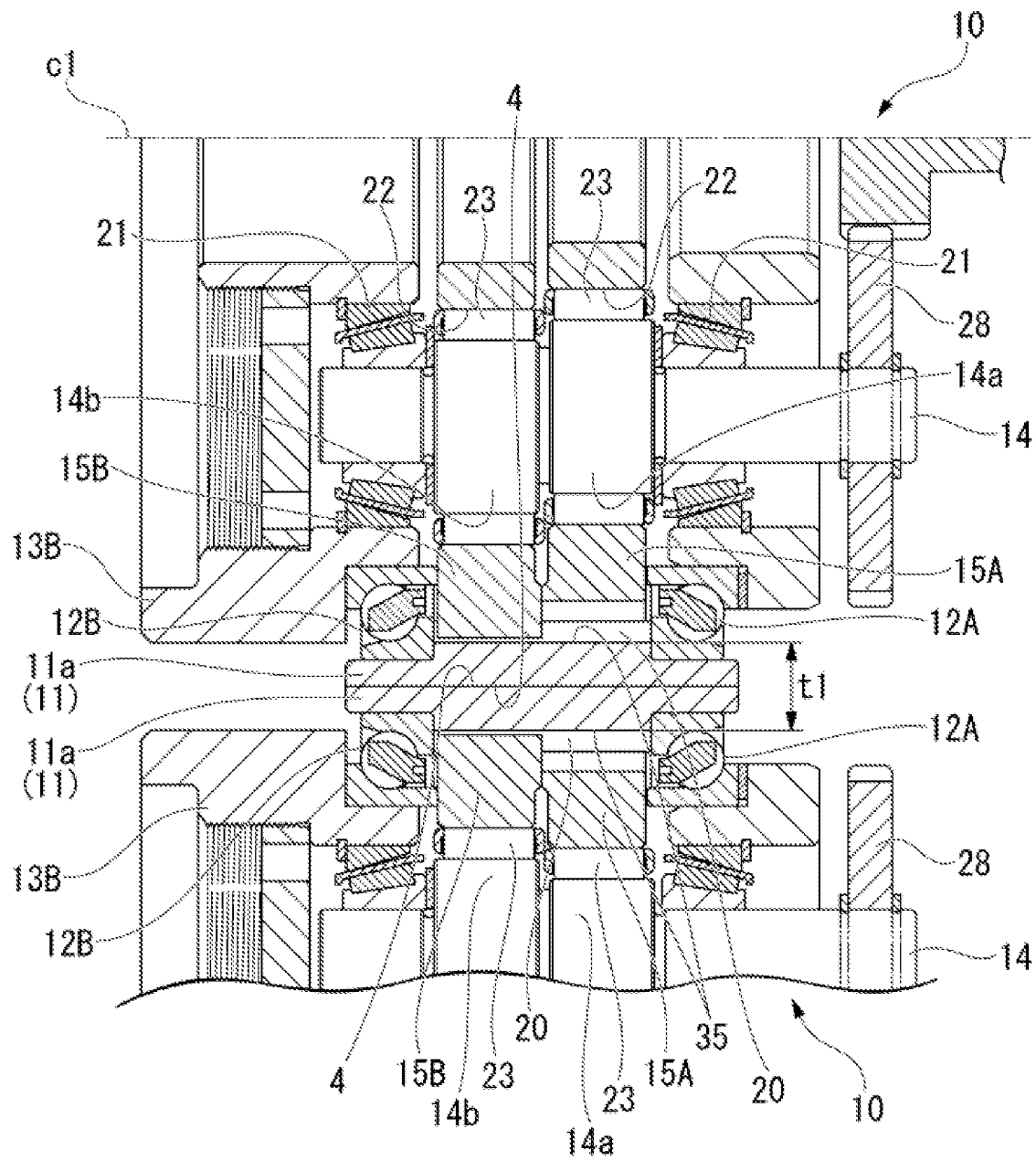
FIG. 4 is a sectional view of two speed reducer units of the embodiment, cut along the line Iv-Iv in FIG. 2.

FIG. 4 is a sectional view of the two speed reducer units 10 shown in FIG. 2, cut along the line Iv-IV In a contact portion at which the flat surfaces 4 of the casings 11 of any two adjacent speed reducer units 10 contact with each other, the regions retaining the inner tooth pins 20 have the following minimum radial thickness t1. The minimum radial thickness t1 of the contact portion at which the flat surfaces 4 contact with each other is set such that the total thickness of the minimum thickness portions in the contact portion of two casings 11 is equal to or smaller than the radial thickness of other portions (portions other than the contact portion) in the peripheral wall 11a of one of the casings 11.

As shown in FIG. 4, for the two speed reducer units 10 of which the peripheral walls 11a of the casings 11 contact with each other, the first oscillating gears 15A and the second oscillating gears 15B (external gears) of the two speed reducer units 10 mesh at the same timings with the meshing regions of the inner tooth pins 20 (internal gears) positioned radially inside the flat surfaces 4 (contact portion) of the respective peripheral walls 11a.

In other words, when the first oscillating gear 15A of one of the two speed reducer units 10 meshes with the meshing region of the inner tooth pins 20 (inner teeth) positioned inside the flat surface 4 (contact portion), the first oscillating gear 15A of the other speed reducer unit 10 meshes at the same timing with the inner tooth pins 20 (inner teeth) positioned inside the flat surface 4 (contact portion). Further, when the second oscillating gear 15B of one of the two speed reducer units 10 meshes with the meshing region of the inner tooth pins 20 (inner teeth) positioned inside the flat surface 4 (contact portion), the second oscillating gear 15B of the other speed reducer unit 10 meshes at the same timing with the inner tooth pins 20 (inner teeth) positioned inside the flat surface 4 (contact portion). Accordingly, when the two speed reducer units 10 are driven, pressing forces acting radially outward from the first oscillating gears 15A and the second oscillating gears 15B onto the thin portions (the portions where the flat surfaces 4 are formed) of the peripheral walls 11a cancel each other.

In the drive device 1 including the speed reducing device 100 described above, when the three motors 2 are driven, the power of the motors 2 is input to the crankshafts 14 of the corresponding speed reducer units 10 through the meshing portions of the input gears 33 and the crankshaft gears 28. This causes the crankshafts 14 of each speed reducer unit 10 to rotate, resulting in revolution of the eccentric portions 14a, 14b of the crankshafts 14 and oscillatory rotation of the first oscillating gear 15A and the second oscillating gear 15B. Then the first oscillating gear 15A and the second oscillating gear 15B spin at a predetermined pitch in a direction opposite to their oscillatory rotation, while meshing with the inner tooth pins 20 of the casing 11. At this time, the first carrier block 13A and the second carrier block 13B rotate integrally with the first oscillating gear 15A and the second oscillating gear 15B with a medium of the crankshafts 14. The rotation of each speed reducer unit 10 thus decelerated is transmitted through the pinion gear 30 to the ring gear 7 and then transmitted through the output plate 8 to the portion to be driven (driven portion). The driving forces of the motors 2 are increased by the three speed reducer units 10 and the meshing portions of the pinion gears 30 and the ring gear 7 to rotate the portion to be driven.

As described above, in the speed reducing device 100 of the embodiment, the casings 11 of the speed reducer units 10 are adjacent to one another, and the thickness of the contact portions (the portions where the flat surfaces 4 are formed) at which two peripheral walls 11a contact with each other is smaller than the thickness of other portions in the circumference of the same peripheral wall 11a. Therefore, as compared to the case where the peripheral walls of the casings each having a uniform thickness contact with each other, the assembly including the plurality of casings joined together can have a smaller size (radial size). Accordingly, with the use of the speed reducing device 100 of the present embodiment, the device as a whole can be downsized.

Further, in the speed reducing device 100 of the embodiment, the strength of the peripheral walls 11a can be reinforced at the contact portions (the portions where the flat surfaces 4 are formed) of two adjacent casings 11. Accordingly, although the contact portions have a small thickness, the strength of the whole assembly of the casings 11 can be inhibited from being reduced.

The present embodiment is described based on an example in which the peripheral walls 11a of two casings 11 contacting with each other have flat surfaces 4, and these flat surfaces 4 contact with each other. However, the contact portions do not necessarily have the flat surfaces 4. For example, it is also possible that only the peripheral wall 11a of one casing 11 has a concave contact portion, and the peripheral wall 11a of the other casing 11 has a convex outer peripheral surface that contacts with the concave contact portion. As in the present embodiment, the contact portions of the peripheral walls 11a of the two casings 11 should have a smaller thickness than other portions in the peripheral walls 11a, such that the assembly of the casings 11 can be downsized while inhibiting the rigidity of the peripheral walls 11a of the two casings 11 from being reduced. In particular, if, as in the present embodiment, the contact portions of the two casings 11 are formed of the flat surfaces 4, and the thin portions of the two casings 11 have the same shape, the rigidity of the peripheral walls 11a of the two casings 11 can be better inhibited from being reduced.

Further, in the speed reducing device 100 of the present embodiment, the total thickness of the contact portions of the two casings with the peripheral walls 11a contacting with each other is equal to or smaller than the thickness of other portions of the peripheral walls 11a of the two casings 11. Therefore, the assembly of the casings 11 can be downsized (in the radial direction).

Further, in the speed reducing device 100 of the embodiment, for any two casings 11 contacting with each other, the corresponding first oscillating gears 15A and second oscillating gears 15B (external gears) mesh at the same timings with the meshing regions of the inner tooth pins 20 (internal gears) positioned radially inside the flat surfaces 4 (contact portions). Therefore, the pressing forces acting radially outward from the first oscillating gears 15A and the second oscillating gears 15B onto the regions of the casings 11 where the contact portions (the flat surfaces 4) are present cancel each other. Accordingly, with the use of the speed reducing device 100 of the present embodiment, the device as a whole can be downsized while inhibiting the deformation of the casings 11.

Further, in the speed reducing device 100 of the present embodiment, the speed reducing mechanism unit of each speed reducer unit 10 is formed of common components having the same sizes and shapes. Therefore, the number of types of the components needed in the speed reducing device 100 can be reduced.

Further, the speed reducing device 100 of the present embodiment includes three speed reducer units 10, and the peripheral wall 11a of the casing of each speed reducer unit 10 is disposed in contact with the peripheral walls 11a of the casings 11 of the other two speed reducer units 10. In addition, the thickness of the contact portions (the flat surfaces 4) of the casings contacting with each other is smaller than the thickness of other portions in the circumference of the same peripheral wall 11a. Therefore, with the use of the speed reducing device 10 of the present embodiment, it is possible to reduce the total thickness of each of the three contact portions of the three casings 11 and reduce the dead space surrounded by the peripheral walls 11a of the three casings 11. Therefore, the assembly of the casings 11 can be downsized.

In particular, in the speed reducing device 100 of the embodiment, the peripheral wall 11a of each casing 11 has two flat surfaces 4 forming an angle of intersection of 120°, and the flat surfaces 4 constitute the contact portions contacting the other casings 11. Therefore, the contact portions of the casings 11 have the same minimum radial thickness. Accordingly, with the use of the speed reducing device 100 of the present embodiment, the assembly of the casings 11 can be efficiently downsized while inhibiting partial reduction of the strength of a part of the casings 11.

Further, in the speed reducing device 100 of the present embodiment, the output portion (the second carrier block 13B) of each speed reducer unit 10 receives rotation transmitted thereto and outputs the rotation to the ring gear 7 via the pinion gear 30. Therefore, with the use of the speed reducing device 100 of the present embodiment, decelerated rotation output from each speed reducer unit 10 can be further decelerated (to have a higher torque) with the pinion gear 30 and the ring gear 7 and output to the output rotating body 3

Other Embodiments

Figure 5:
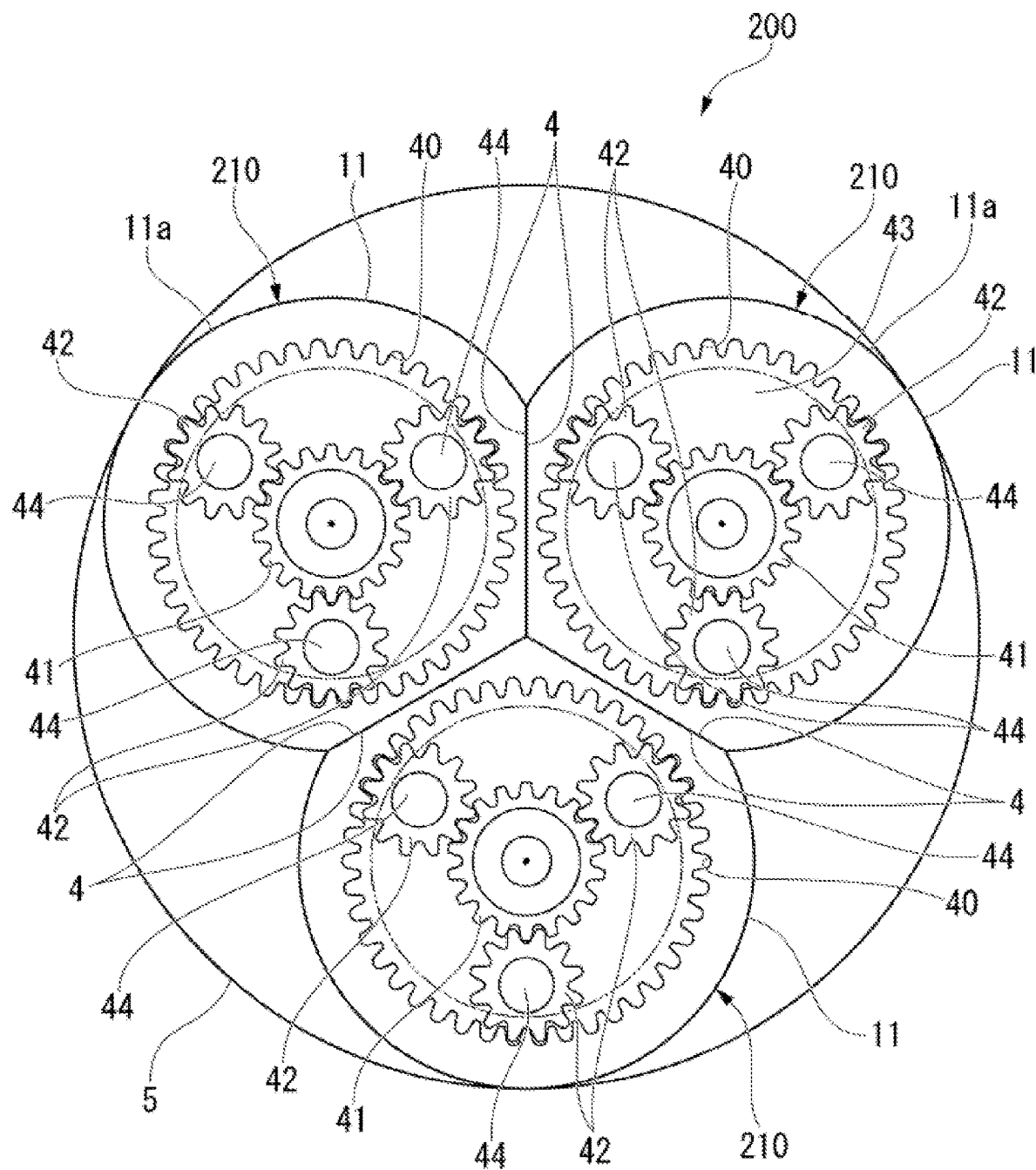
FIG. 5 is a view showing a speed reducing device of another embodiment, corresponding to FIG. 2.

FIG. 5 is a view of a speed reducing device 200 of another embodiment, corresponding to the view in the direction of the arrow II of FIG. 1. In the speed reducing device 200 of the present embodiment, the configuration of each speed reducer unit 210 is different from that in the above embodiment. In each of the speed reducer units of the above embodiment, the pin grooves 35 are formed on the inner peripheral side of the peripheral wall 11a of the casing 11, and the inner tooth pins 20 are retained in the pin grooves 35. Further, the first oscillating gear 15A, the second oscillating gear 15B, the crankshafts 14, the first carrier block 13A, the second carrier block 13B, and other members constitute an eccentrically oscillating speed reducing mechanism unit. By contrast, in each of the speed reducer units 210 of the present embodiment, inner teeth 40 are formed on the inner peripheral side of the peripheral wall 11a of the casing 11, and the speed reducing mechanism unit meshing with the inner teeth 40 to decelerate the input rotation is constituted by a planetary gear mechanism.

The speed reducing mechanism unit of the speed reducer unit 210 includes a sun gear 41 connected to a rotational shaft of a motor (not shown), a plurality (for example, three) of planetary gears 42 (external gears) meshing with the sun gear 41 and the inner teeth 40 of the casing 11, and a carrier 43 rotatably supported on the casing 11. The plurality of planetary gears 42 are rotatably supported on a carrier pin 44 of the carrier 43. A pinion gear (not shown) is coaxially connected to the carrier 43. The pinion gear meshes with a ring gear (not shown) that serves as an output rotating body as in the above embodiment.

In the speed reducing mechanism unit of the present embodiment, the input rotation from the motor to the sun gear 41 causes the planetary gears 42 to spin in mesh with the sun gear 41 and the inner teeth 40 of the casing 11 and revolve at a speed reduced at a predetermined reduction ratio. Thus, the carrier 43 supporting the planetary gears 42 rotates at the speed reduced at the predetermined reduction ratio, and this rotation is transmitted to a driven portion through the meshing portion of the pinion gear and the ring gear.

As in the above embodiment, the speed reducing device 200 of the present embodiment also includes three speed reducer units 210 arranged in parallel. In each of the speed reducer units 210, the outer surface of the peripheral wall 11a of the casing 11 includes two flat surfaces 4 forming the contact portions. Each of the flat surfaces 4 is in surface contact with the corresponding flat surface 4 of an adjacent speed reducer unit 210. The two flat surfaces of the peripheral wall 11a are formed to have an angle of intersection of 120°, as in the above embodiment. In the peripheral wall 11a of the casing 11, the portions including the flat surfaces 4 (contact portions) have a smaller thickness than other portions in the same peripheral wall 11a. The peripheral wall 11a in each casing 11 is configured in the same manner as in the above embodiment.

Further, in the speed reducing device 200 of the present embodiment, for any two casings 11 contacting with each other, the corresponding planetary gears 42 (external gears) mesh at the same timings with the meshing regions of the inner teeth 40 positioned radially inside the flat surfaces 4 (contact portions). Further, in the present embodiment, the three speed reducing units 210 are formed of common components having the same sizes and shapes.

In the speed reducing device 200 of the present embodiment, the speed reducing mechanism units have different configuration, as described above, but the peripheral walls 11a of the casings 11 are configured in the same manner as in the above embodiment. Therefore, the speed reducing device 200 of the present embodiment can produce the same advantageous effects as in the above embodiment.

Figure 6:
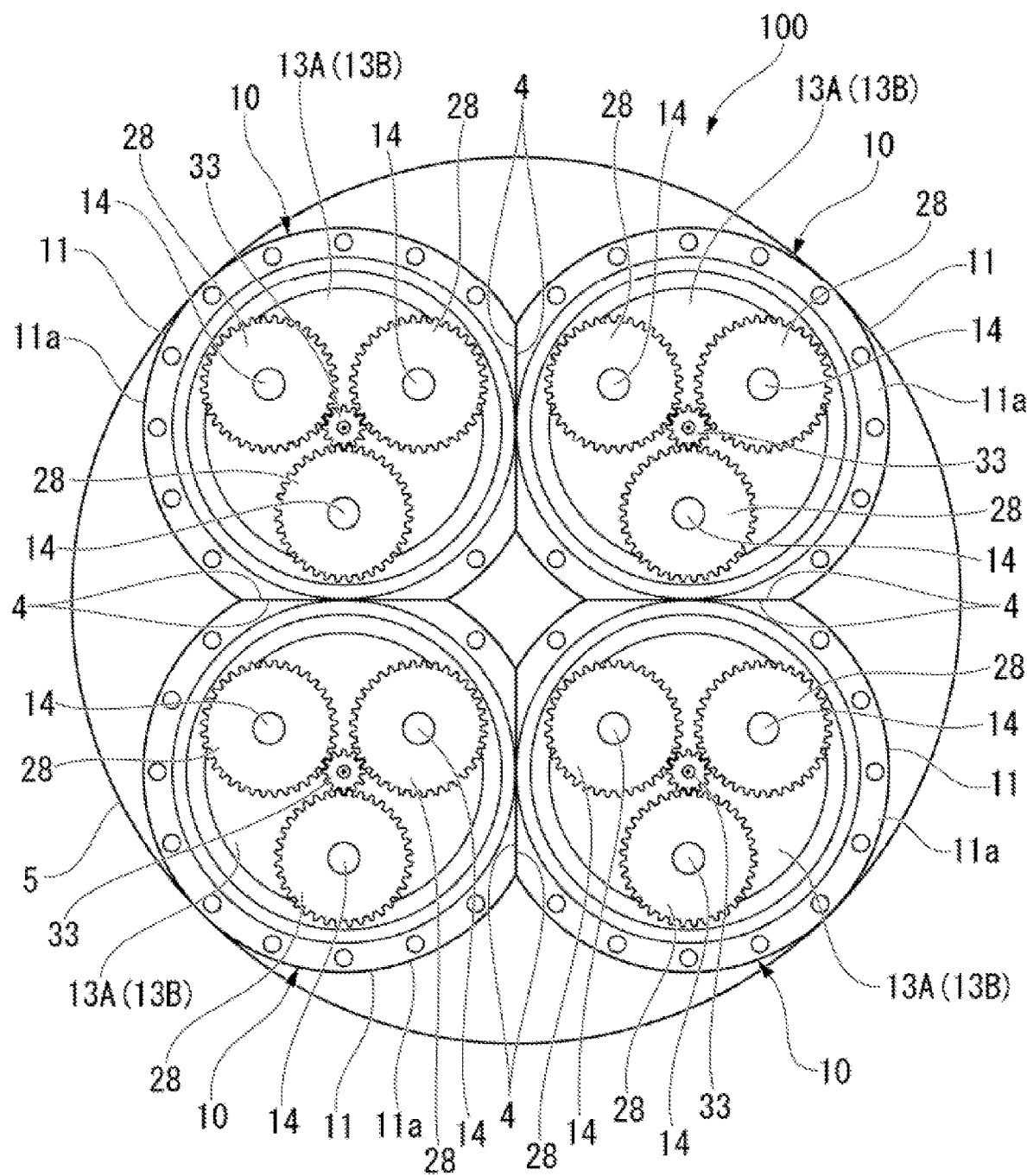
FIG. 6 is a view showing a speed reducing device of a first modification, corresponding to FIG. 2.
Figure 7:
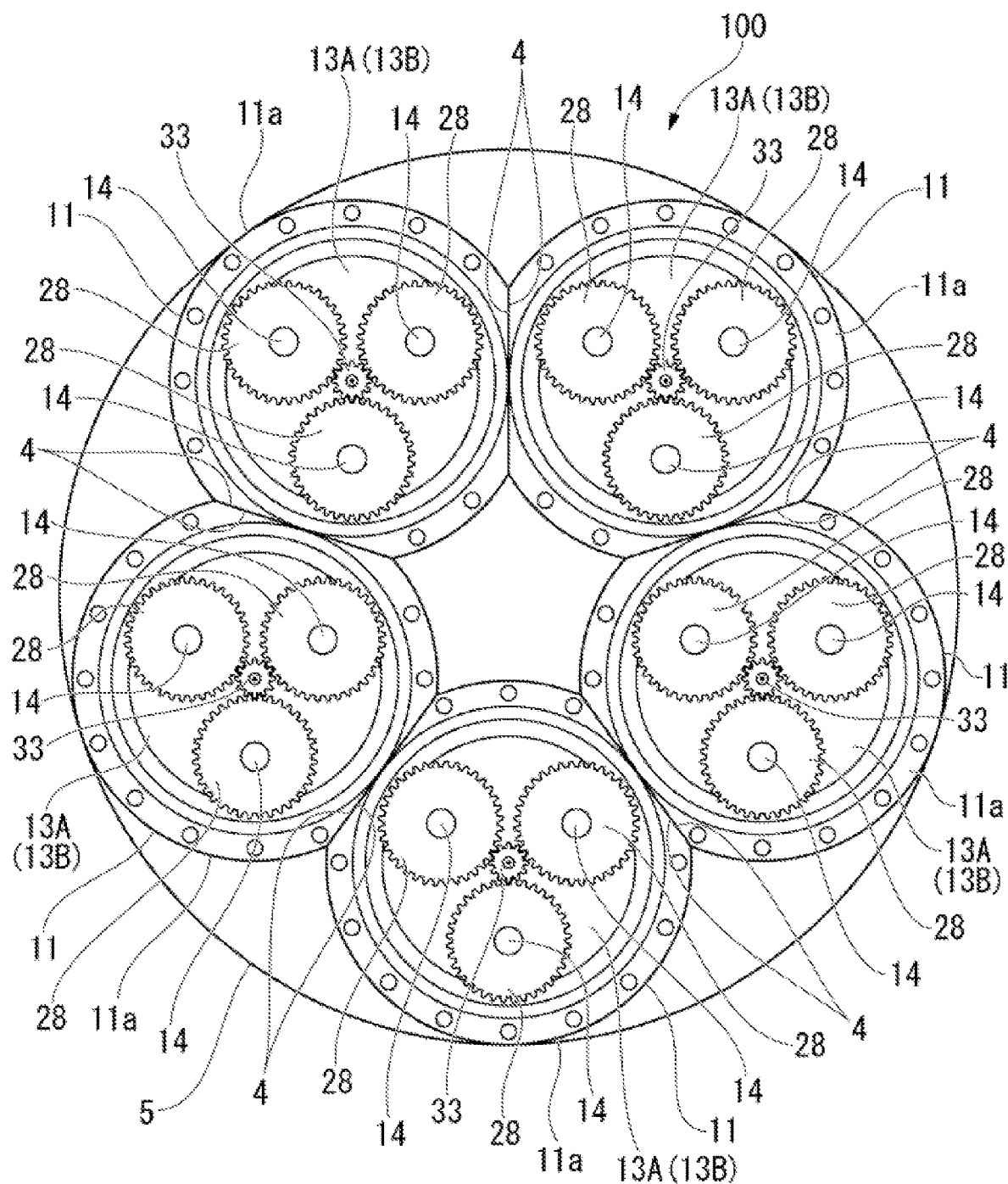
FIG. 7 is a view showing a speed reducing device of a second modification, corresponding to FIG. 2.

The present invention is not limited to the above-described embodiments but can be modified in a variety of designs without deviating from the spirit of the present invention. For example, the speed reducing device is not necessarily formed of three speed reducer units, but may be formed of four or more speed reducer units 10, as in the first modification shown in FIG. 6 and the second modification shown in FIG. 7. In such cases, it is still preferable that in each speed reducer unit 10, the peripheral wall 11a of the casing 11 has two flat surfaces 4 as the contact portions each contacting with the casing of an adjacent speed reducer unit 10. For n speed reducer units 10, the two flat surfaces formed on each peripheral wall 11a are preferably arranged at an angle of 360°/n as viewed from the axial direction. With this arrangement, the contact portions of the peripheral walls 11a of the casings 11 have the same thickness and shape. As a result, the assembly of the casings 11 as a whole can have a substantially uniform strength, and the assembly of the casings 11 as a whole can be downsized. Note that the speed reducing device may be formed of two speed reducer units.

INDUSTRIAL APPLICABILITY

The present disclosure makes it possible to include a plurality of speed reducer units but have a small overall size. Accordingly, the present disclosure is industrially applicable.

What is claimed is:

1. A speed reducing device comprising:
   a plurality of speed reducer units arranged in parallel; and
   an output rotating body configured to rotate by power received from an output side of each of the plurality of speed reducer units,
   wherein each of the plurality of speed reducer units includes:
      a casing having a peripheral wall with inner teeth disposed on an inner periphery of the peripheral wall; and
      a speed reducing mechanism unit meshing with the inner teeth to reduce a speed of input rotation,
   wherein at least two of the plurality of speed reducer units are disposed adjacent to each other such that outer surfaces of the peripheral walls of the casings thereof are in contact with each other, and
   wherein in at least one of any two of the peripheral walls contacting with each other, a thickness of a contact portion is smaller than a thickness of other portions in a circumference of the same peripheral wall.

2. The speed reducing device of claim 1, wherein in each of any two of the casings of which the outer surfaces of the peripheral walls are in contact with each other, a thickness of a contact portion is smaller than a thickness of other portions in a circumference of the same peripheral wall.

3. The speed reducing device of claim 2, wherein in any two of the casings of which the outer surfaces of the peripheral walls are in contact with each other, a total thickness of contact portions is equal to or smaller than a thickness of other portions of the peripheral walls of the two casings.

4. The speed reducing device of claim 3,
   wherein the speed reducing mechanism unit includes an external gear meshing with the inner teeth, and wherein in any two of the plurality of speed reducer units of which the outer surfaces of the peripheral walls of the casings are in contact with each other, the corresponding external gear of each of the two speed reducer units meshes at same timings with a meshing region of the inner teeth positioned inside the contact portion.

5. The speed reducing device of claim 3,
wherein an output portion of each of the plurality of speed reducer units includes a pinion gear, and
wherein the output rotating body includes a ring gear meshing with the pinion gear of each of the plurality of speed reducer units.

6. The speed reducing device of claim 2,
wherein the speed reducing mechanism unit includes an external gear meshing with the inner teeth, and
wherein in any two of the plurality of speed reducer units of which the outer surfaces of the peripheral walls of the casings are in contact with each other, the corresponding external gear of each of the two speed reducer units meshes at same timings with a meshing region of the inner teeth positioned inside the contact portion.

7. The speed reducing device of claim 2,
wherein an output portion of each of the plurality of speed reducer units includes a pinion gear, and
wherein the output rotating body includes a ring gear meshing with the pinion gear of each of the plurality of speed reducer units.

8. The speed reducing device of claim 1,
wherein the speed reducing mechanism unit includes an external gear meshing with the inner teeth, and
wherein in any two of the plurality of speed reducer units of which the outer surfaces of the peripheral walls of the casings are in contact with each other, the corresponding external gear of each of the two speed reducer units meshes at same timings with a meshing region of the inner teeth positioned inside the contact portion.

9. The speed reducing device of claim 8,
wherein an output portion of each of the plurality of speed reducer units includes a pinion gear, and
wherein the output rotating body includes a ring gear meshing with the pinion gear of each of the plurality of speed reducer units.

10. The speed reducing device of claim 1, wherein the speed reducing mechanism unit of each of the plurality of speed reducer units is formed of common components having same sizes and shapes.

11. The speed reducing device of claim 10,
wherein an output portion of each of the plurality of speed reducer units includes a pinion gear, and
wherein the output rotating body includes a ring gear meshing with the pinion gear of each of the plurality of speed reducer units.

12. The speed reducing device of claim 1,
wherein an output portion of each of the plurality of speed reducer units includes a pinion gear, and
wherein the output rotating body includes a ring gear meshing with the pinion gear of each of the plurality of speed reducer units.

13. A speed reducing device comprising:
three speed reducer units arranged in parallel; and
an output rotating body configured to rotate by power received from an output side of each of the three speed reducer units,
wherein each of the three speed reducer units includes:
a casing having a peripheral wall with inner teeth disposed on an inner periphery of the peripheral wall; and
a speed reducing mechanism unit meshing with the inner teeth to reduce a speed of input rotation,
wherein the peripheral wall of the casing of each of the three speed reducer units is disposed in contact with the peripheral walls of the casings of the other two speed reducer units, and
wherein in at least one of the peripheral walls of the casings contacting with each other, a thickness of a contact portion is smaller than a thickness of other portions in a circumference of the same peripheral wall.

14. The speed reducing device of claim 13, wherein three contact portions of the casings of the three speed reducer units are formed of linear flat surfaces as viewed from an axial direction, and the flat surfaces disposed adjacent to each other form an angle of intersection of 120° as viewed from the axial direction.

15. The speed reducing device of claim 14,
wherein an output portion of each of the plurality of speed reducer units includes a pinion gear, and
wherein the output rotating body includes a ring gear meshing with the pinion gear of each of the plurality of speed reducer units.

16. The speed reducing device of claim 13,
wherein an output portion of each of the plurality of speed reducer units includes a pinion gear, and
wherein the output rotating body includes a ring gear meshing with the pinion gear of each of the plurality of speed reducer units.

17. A drive device comprising:
a speed reducing device; and
a drive source for transmitting a driving force to the speed reducing device,
wherein the speed reducing device includes:
a plurality of speed reducer units arranged in parallel and configured to receive power from the drive source; and
an output rotating body configured to rotate by power received from an output side of each of the plurality of speed reducer units,
wherein each of the plurality of speed reducer units includes:
a casing having a peripheral wall with inner teeth disposed on an inner periphery of the peripheral wall; and
a speed reducing mechanism unit meshing with the inner teeth to reduce a speed of input rotation,
wherein at least two of the plurality of speed reducer units are disposed adjacent to each other such that outer surfaces of the peripheral walls of the casings thereof are in contact with each other, and
wherein in at least one of any two of the peripheral walls contacting with each other, a thickness of a contact portion is smaller than a thickness of other portions in a circumference of the same peripheral wall.

* * * * *